(12) United States Patent
Hirano

(10) Patent No.: US 6,189,371 B1
(45) Date of Patent: Feb. 20, 2001

(54) METHOD FOR ADJUSTING ROTATION BALANCE OF DISK AND DEVICE FOR THE SAME

(75) Inventor: Toshiki Hirano, San Jose, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/052,999

(22) Filed: Mar. 31, 1998

Related U.S. Application Data

(62) Division of application No. 08/753,936, filed on Dec. 3, 1996, now Pat. No. 5,811,678.

(30) Foreign Application Priority Data

Dec. 7, 1995 (JP) ................................. 7-318807

(51) Int. Cl.⁷ ........................ G01M 1/00; G01B 17/08
(52) U.S. Cl. ................................... 73/66; 360/99.08
(58) Field of Search .................... 73/461, 66, 460, 73/462, 478, 487, 459, 1.14, 1.84; 360/99.09, 98.08, 99.05, 99.12

(56) References Cited

U.S. PATENT DOCUMENTS

| | | |
|---|---|---|
| 3,817,088 | 6/1974 | Herbig ................................. 73/66 |
| 4,676,672 | 6/1987 | Tufty ................................. 384/537 |
| 4,683,505 | 7/1987 | Schmidt et al. ....................... 360/98 |
| 4,739,425 | 4/1988 | Dierkes et al. ....................... 360/97 |
| 4,870,703 | 9/1989 | Augeri et al. ..................... 360/98.07 |
| 5,014,146 | 5/1991 | Takatsuka et al. ................... 360/106 |
| 5,016,131 | 5/1991 | Riggle et al. ....................... 360/106 |
| 5,043,973 | 8/1991 | Ocheltree et al. ................... 369/270 |
| 5,521,772 | 5/1996 | Lee et al. ............................. 360/75 |
| 5,537,272 | 7/1996 | Kazmierczak et al. ........... 360/99.08 |
| 5,572,382 | 11/1996 | Kuno ............................... 360/98.08 |
| 5,811,678 | * 9/1998 | Hirano .................................. 74/461 |

FOREIGN PATENT DOCUMENTS

| | | |
|---|---|---|
| 60-187966 | 9/1985 | (JP) . |
| 3-69060 | 3/1991 | (JP) . |

* cited by examiner

*Primary Examiner*—Helen C. Kwok
(74) *Attorney, Agent, or Firm*—G. Marlin Knight

(57) ABSTRACT

The present invention provides a method and apparatus to adjust the rotation balance of a disk with high accuracy and ease during manufacturing. A disk is attached to a spindle to form a disk assembly having an adjustable center of gravity. The disk assembly is rotated and thereby generates vibration. A force, which is a function of the vibration, is applied to one or more components of the disk assembly to reduce vibration of the disk assembly below a predetermined value thereby causing the disk assembly to have a second center of gravity.

10 Claims, 13 Drawing Sheets

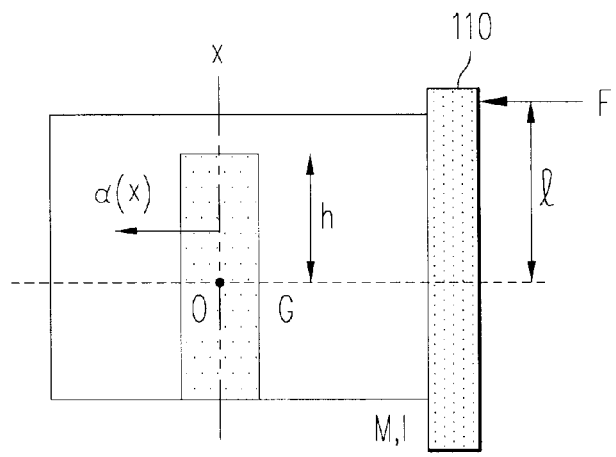
FIG. 13b
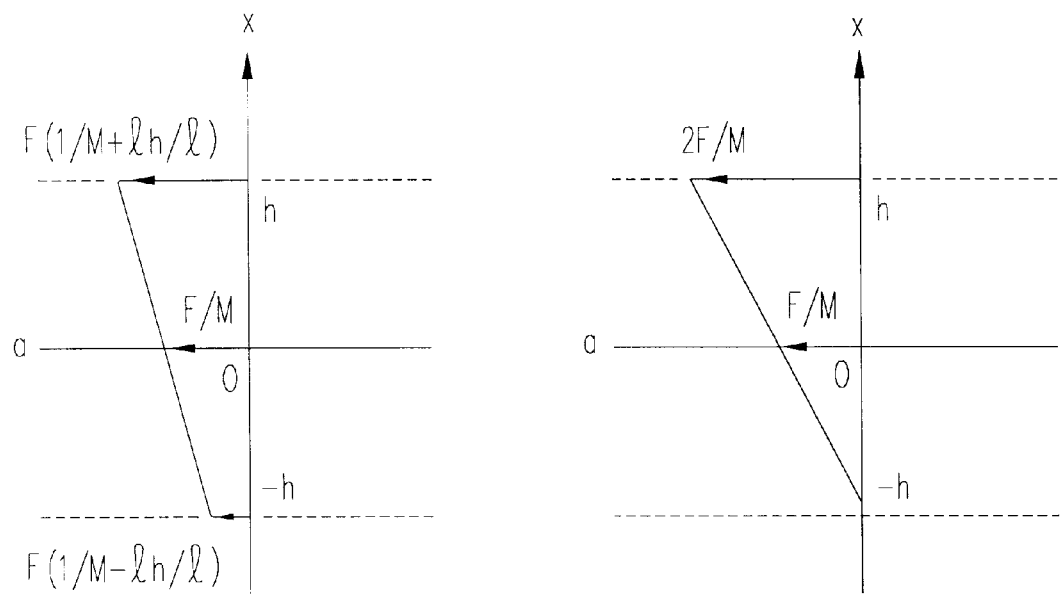
FIG. 13c
FIG. 13d

METHOD FOR ADJUSTING ROTATION BALANCE OF DISK AND DEVICE FOR THE SAME

RELATED APPLICATION

This application is a divisional of Ser. No. 08/753,936, filed Dec. 3, 1996, issued as U.S. Pat. No. 5,811,678.

FIELD OF THE INVENTION

The present invention relates to a method and apparatus for adjusting the rotation balance of a disk, and in particular to a method and apparatus for aligning the center of rotation of a disk with the axis of rotation of a spindle during disk drive assembly.

BACKGROUND OF THE INVENTION

Typically, a disk drive has a circular magnetic disk for storing data. The disk is mounted on a spindle which is rotated about a longitudinal axis or axis of rotation. Data is read from and written to the surface of the disk while the disk is rotating. To rotate the disk, a spindle motor transmits a driving force to rotate the spindle. A mechanism then positions a magnetic head over a desired area of the disk surface to read data already recorded on the disk or to write data to the disk. To position the head accurately, it is very important that the center of the disk be precisely aligned with the spindle to prevent the disk from being offset during rotation. Therefore, a process is needed to align the center of the disk with the axis of rotation of the spindle. In other words, a process is needed to keep the offset of the disk within an allowable error (tolerance), and fix the disk to the spindle during manufacturing.

The operation of adjusting the offset of a rotating disk to be within an allowable error is generally referred to as the adjustment of rotation balance. Rotation balance has two components: static balance and dynamic balance. Static balancing refers to decreasing the vibration component generated by a translational force during rotation. Dynamic balancing refers to decreasing the vibration component generated by torque during rotation. Generally, if the distance between a plurality of masses fixed to an axis of rotation or spindle is short, the effect of the dynamic imbalance is negligible relative to the effect of the static imbalance. However, as the distance increases, the effect of the dynamic imbalance increases; and the dynamic imbalance can no longer be ignored.

In a hard disk drive, when a small number of disks are fixed to the spindle, the length of the spindle is small; therefore, the dynamic balance may be ignored. However, as the number of disks increases, both the dynamic and static balance need to be adjusted. Preferably, the amount of static and dynamic imbalance is 0. However, in practice, it is very difficult to completely eliminate all imbalance. Therefore, a process is needed to adjust the static and dynamic balance during disk drive manufacture so that the amount of imbalance falls below a predetermined threshold value to prevent problems when the disk drives are used. The adjustment of the static and dynamic balance will be described below.

Adjusting Static Balance

Initially the adjustment of the static balance will be described while referring to FIGS. 1, 2a, 2b and 2c. FIG. 1 is a diagram of the force resulting from disk offset. A magnetic disk drive 200 has a disk 204, e.g. a magnetic disk, fixed to a spindle 202. Because the outer diameter of the spindle 202 is smaller than the inner diameter of a central hole in the disk, a gap as large as several hundred microns forms between the disk and the spindle. Accordingly, when the disk 204 is fixed to the spindle 202, the center of the spindle of the disk 0 is frequently offset, by amount e, from the center of gravity G of the disk, therefore the disk is frequently imbalanced. If the disk is imbalanced, a translational force P is generated when the disk 204 rotates.

FIGS. 2a, 2b and 2c show the relationship between the periodic motion of the disk and the direction of the translational force resulting from the offset. The translational force P, with a continuously changing direction, is exerted between the disk 204 and the spindle 202. As the amount of vibration from the translational force P increases, errors are more likely to occur when reading or writing data.

Referring back to FIG. 1, a disk 204 of mass m rotates at angular velocity ω while offset by dimension e relative to the center O of the spindle 202 of a fixed disk drive 200. The translational force P has a vertical component F urging the disk drive 200 downward. The magnitude of the vertical force F is determined by the following equation (1):

$$F = me\omega^2 \sin(\omega t) \tag{1}$$

For example, if a 2.5 inch aluminum disk rotates at 3,600 revolutions per minute (RPM) with a offset of 0.1 mm, the maximum value of the magnitude of force F is about 10 g. Equation (1) shows that the magnitude of force F is directly proportional to both the rotation frequency and the number of disks. If either the rotation frequency or the number of disks increases, then the magnitude of force F will increase. For example, if the 2.5 inch aluminum disk above is rotated at 4,800 RPM, the magnitude of force F is 1.8 times larger than at 3,600 RPM. The static balance adjustment means decreasing the amount of vibration caused by the translational force during disk rotation.

Adjusting the Dynamic Balance

Next, the adjustment of the dynamic balance will be described while referring to FIGS. 3a and 3b. FIG. 3a shows a plurality of disks 204 fixed to a spindle 202. FIG. 3b is a dynamic model of the plurality of disks of FIG. 3a. In FIG. 3b, according to rigid body kinematics, the rotation imbalance of a distributed mass system can be equivalently represented by two concentrated weights 201, 203 on two arbitrarily selected planes S1, S2 on the axis 202. The two concentrated weights 201, 203 have mass m1 and m2, respectively, and have corresponding vectors $r_1$ and $r_2$. The planes S1, S2 are spaced apart at a distance 1 along the spindle 202. During rotation, a vibration component is generated by the torque based on the equivalent amount of imbalance $m_1 \cdot r_1$, $m_2 \cdot r_2$ between the two planes. Adjusting the dynamic balance decreases the amount of vibration from the torque.

To satisfy the increased demand for high speed and large storage capacity, disk drives have more disks and rotate faster. Consequently, the problem of efficiently reducing the imbalance has become more significant. Therefore, the adjustment of static balance and dynamic balance has become increasingly important in disk drive manufacture.

Using a conventional technique, imbalance is adjusted by: rotating a disk, measuring the position and amount of imbalance, and attaching a counterweight with a controlled mass to a side opposite a stopped position. The counterweight must be attached while the disk is stopped. Furthermore, the balance adjusting operation must be repeated many times for accurate adjustment. Because the disk is repeatedly rotated and stopped, the method has the disadvantage of taking a long time.

Another method has been proposed which uses a screw as a counterweight. However, this method not only had the disadvantages discussed above, but also had the disadvantage of being difficult to make a fine balance adjustment since the tapped hole has a predetermined position.

In addition, Japanese Published Unexamined Patent Application No. 60-187966 discloses a method of rotating the disk at a frequency higher than a critical speed while the disk is offset and fixing the disk to the axis when the rotation is brought close to 0. However, rotating the disk above the critical speed puts a very large load on the spindle motor and may reduce the life of the disk drive. Therefore, this method is not always practical.

Recently, Japanese Published Unexamined Patent Application No. 3-69060 has disclosed a method using an offset compensator to overcome the disadvantages discussed above. The offset compensator has several components. A clamp, such as a magnet, is capable of moving radially across a disk. A spindle motor part guide is formed to enable the spindle motor to move radially with the clamp. A device measures the amount of offset between the center of a concentric circular or spiral track on the disk and the center of rotation of the spindle motor part using a push-pull and track-crossing signal from an optical pick-up. A driving device exerts acceleration on the spindle motor part. Acceleration is exerted on the spindle motor part and the clamp position of the disk is shifted using the inertia of the disk so that the center of the concentrically circular or spiral track is aligned with the center of rotation of the spindle motor part.

The offset compensator aligns the center of a concentric circular or spiral track of the disk with the center of rotation of the motor using the optical pick-up. In other words, by assuming that the center of gravity of the disk coincides with the center of a track, the center of the track is aligned with the axis of rotation of the spindle. Generally, the recording density of a fixed disk is much higher than a removable disk. Therefore, the alignment of the fixed disk requires much more accurate positioning than the disclosed removable disk. Since the center of a concentric circular track on the disk surface does not always exactly coincide with the center of gravity, the method may not provide satisfactory accuracy when used to align fixed disks having a high recording density. In fact, Publication No. 3-69060 discloses a method for aligning removable disks. However, the Publication does not describe a method of a aligning a fixed disk. Furthermore, the Publication describes a method of adjusting static balance and does not mention the adjustment of dynamic balance, which is needed when a plurality of disks are fixed to a spindle. In addition, the method also has the disadvantage that a track must be formed on the disk surface prior to the adjustment.

SUMMARY OF THE INVENTION

The present invention overcomes many disadvantages of conventional techniques.

One object of the invention is to provide a method and apparatus for readily adjusting the adjusting rotation balance of a fixed disk mounted in a device with high accuracy during assembly.

Another object of the invention is to provide a method and apparatus for rapidly adjusting the rotation balance of a disk while rotating the disk.

To achieve the above objects, the present invention provides a method and apparatus to adjust the rotation balance of a disk with high accuracy and ease during manufacturing.

In a first embodiment, a method adjusts the rotation balance by rotating a disk. A disk is attached to a spindle to form a disk assembly having an adjustable center of gravity. The disk assembly is rotated and thereby generates vibration. A force, which is a function of the vibration, is applied to one or more components of the disk assembly to reduce vibration of the disk assembly below a predetermined value thereby causing the disk assembly to have a second center of gravity.

In addition, a spindle is inserted into the inner hole of a disk and the disk is adjustably fixed to the spindle. While the disk is rotating, the time variation of the first force generated in a first radial direction of the disk is measured. Acceleration is applied to the spindle in a second radial direction based on the measured time variation of the force and the absolute value of the force is decreased to or below a predetermined threshold.

To decrease the absolute value of the magnitude of the force, the acceleration is repeatedly applied in the second radial direction synchronous with the period of the force's frequency, i.e. at integer multiples of the period.

A second embodiment of the present invention provides a method for assembling a fixed disk drive. The spindle is inserted into the central hole of the disk. The disk is adjustably fixed to the spindle and the disk is rotated. During rotation, a force is generated radially along the disk. The force is measured to obtain the amount of offset between the center of the disk and the center of the spindle. Acceleration is applied to the spindle in a prescribed radial direction of the disk based on the amount of offset. The disk is fixed to the spindle.

In the present invention, a fixed disk drive means a drive in which a disk has already been built into the disk drive during disk drive assembly.

A third embodiment of the present invention provides a method for assembling a fixed disk drive. An adhesive agent is applied to the disk or the spindle. The disk is adjustably fixed to the spindle by inserting the spindle into the central hole of the disk. The disk together with the spindle is rotated to measure a radial force along the disk and obtain the amount of offset of the center of the disk relative to the center of the spindle. The spindle is accelerated in a prescribed radial direction. The amount of offset between the center of the disk relative to the center of the spindle is adjusted to below a prescribed threshold value.

In this case, it is important to adjust the amount of offset to below the prescribed threshold, before the disk is fixed to the spindle using the adhesive agent.

A fourth embodiment of the present invention provides a method for assembling a fixed disk drive. The spindle is inserted into the central hole of the disk. The disk is adjustably fixed to the spindle. The disk is rotated and a radial force is measured. Acceleration is applied in a prescribed radial direction of the disk relative to the spindle to control the amount of offset between the center of the disk and to the center of the spindle to below a prescribed threshold value. A fixing means further fastens the disk to the spindle.

A fifth embodiment of the present invention provides a rotation balance adjuster for adjusting the rotation balance of a disk fixed to a spindle. The disk is adjustably fixed to the spindle and rotated. A measuring means measures a force generated in a first radial direction of the disk. An acceleration exerting means exerts a prescribed acceleration on the spindle in a second radial direction. A control means controls the acceleration exerting means to repeatedly exert the acceleration on the spindle at time intervals integer times as long as a period of the measured force of the measuring means.

A sixth embodiment of the present invention provides a method for assembling a disk drive having a plurality of disks axially fixed to a spindle. The spindle is inserted into the central holes of the respective disks to adjustably fix the plurality of disks to the spindle. While the spindle and disks are rotating, the time variation of force generated in a first radial direction in a plurality of axially different measuring positions of the spindle is measured. Acceleration is exerted in a second radial direction on desired measuring positions of the spindle based on the time variation of the force measured at the respective measuring positions. The absolute values of each respective force is reduced to below prescribed thresholds. The plurality of disks are fixed to the spindle.

A seventh embodiment of the present invention provides a rotation balance adjuster for adjusting the rotation balance of a plurality of disks fixed to a spindle. While rotating the disks, at least one measuring means measures a force generated in at least one radial direction at least one measuring position along the spindle. An acceleration exerting means exerts a prescribed acceleration on the spindle in a second radial direction. A control means controls the acceleration exerting means to exert the acceleration using the measured force of the measuring means.

BRIEF DESCRIPTION OF THE DRAWINGS

FIG. 3b is a dynamic model of the plurality of disks of FIG. 3a;

FIG. 13b illustrates a method for selectively controlling the amount of disk offset using a dynamic model of the fifth embodiment of the present invention of FIG. 13a;

FIG. 13c is a conceptual view of the distribution of the acceleration of FIG. 13b;

FIG. 13d is a conceptual view of the distribution of the acceleration when the acceleration exerted on the lower disk of FIG. 13b is 0;

DESCRIPTION OF THE PREFERRED EMBODIMENTS

Figure 4:
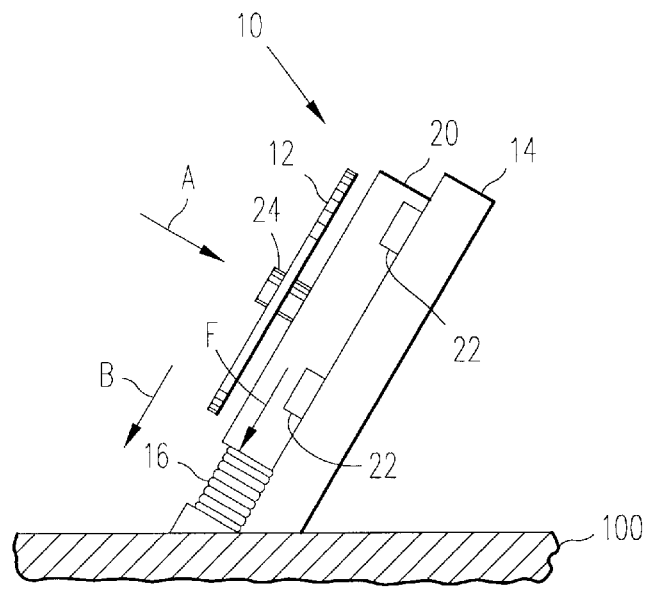
FIG. 4 is a side view of a disk rotation balance adjuster in a first embodiment of the present invention.
Figure 5:
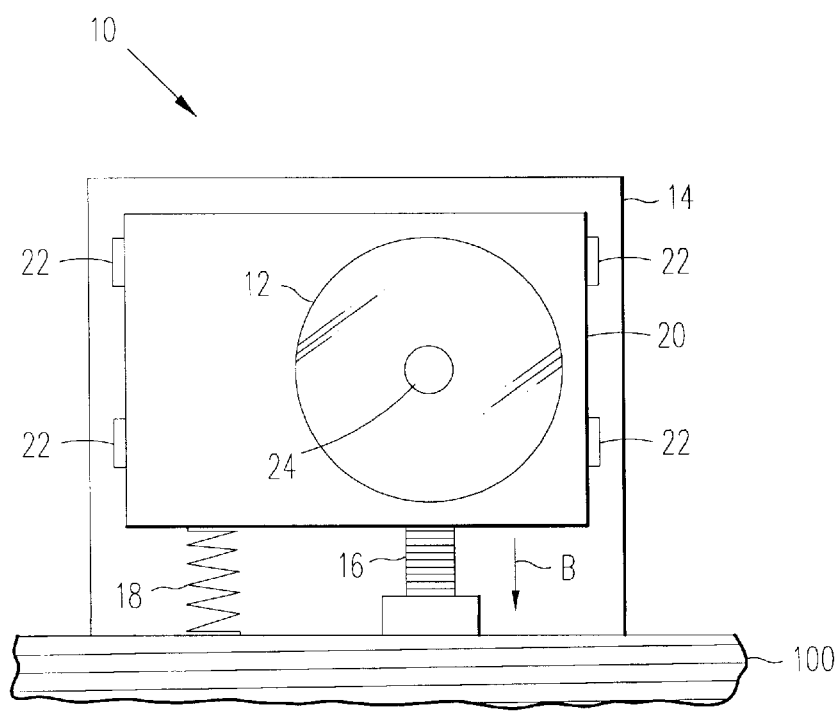
FIG. 5 is a front view of the disk rotation balance adjuster of the first embodiment of the present invention of FIG. 4.

FIG. 4 is a side view of a disk rotation balance adjuster in a first embodiment of the present invention. FIG. 5 is a front view of the rotation balance adjuster of FIG. 4 viewed from the direction of arrow A. The disk rotation balance adjuster 10 is used in the steps of assembling a fixed disk drive in which a magnetic disk, or the like, has previously been installed. More specifically, the present invention is used to adjust the rotation balance of a disk 12 by reducing vibration to below a specified value or threshold during disk drive assembly. After adjusting the rotation balance, the disk 12 is then permanently fixed to the spindle 24.

Although the embodiments will be described using an exemplary magnetic disk, the present invention is not meant to be limited to magnetic disks. The rotation balance adjuster of the present invention can be used with any disk which has previously been fixed in a disk drive or similar device.

In FIG. 4, the disk rotation balance adjuster 10 is provided with a support member 14 having a prescribed thickness which is arranged on a fixed base 100 and inclined at a prescribed angle. Referring also to FIG. 5, a force measuring/acceleration generating element, piezoelectric element 16, e.g. a piezo-element, is arranged at a central and somewhat rightward position in the longitudinal direction along the front of the support member 14. A compression coil spring 18 is arranged at a central and somewhat leftward position in the longitudinal direction along the front of the support member 14.

A disk drive 20 is supported by the piezoelectric element 16 and the compression coil spring 18 on the support member 14. Two pairs of guides 22 are provided at both ends of the support member 14 normal to the longitudinal direction of the support member 14. The disk drive 20 can move back and forth parallel to arrow B along the two pairs of guides 22. It is assumed that frictional force between the guides 22, the support member 14 and the disk drive 20 is extremely small. Furthermore, when voltage is not applied to the piezoelectric element 16 and the rotation of the disk 12 is stopped, the disk drive 20 is held in a state parallel to the plane of the fixed base 100.

A spindle motor (not shown) is housed in the disk drive 20. The spindle motor rotates the spindle 24 about its longitudinal axis. The spindle 24 is normal to the plane of the disk drive 20. The spindle 24 is inserted into a central hole of a circular disk 12 and the disk 12 is adjustably fixed to the spindle 24. The diameter of the spindle 24 is slightly smaller than the diameter of the central hole. Therefore, a gap, as small as several hundred microns, is formed between the disk 12 and the spindle 24. The disk is movably or adjustably fixed to the spindle 24, and the center (center of gravity) of the disk 12 is offset with respect to the center of the spindle 24. Movably or adjustably fixed means a state in which the disk is fixed to the spindle 24 with sufficient strength to allow the spindle 24 to rotate the disk, but weak enough to move when the disk drive or device is sufficiently accelerated.

Figure 6:
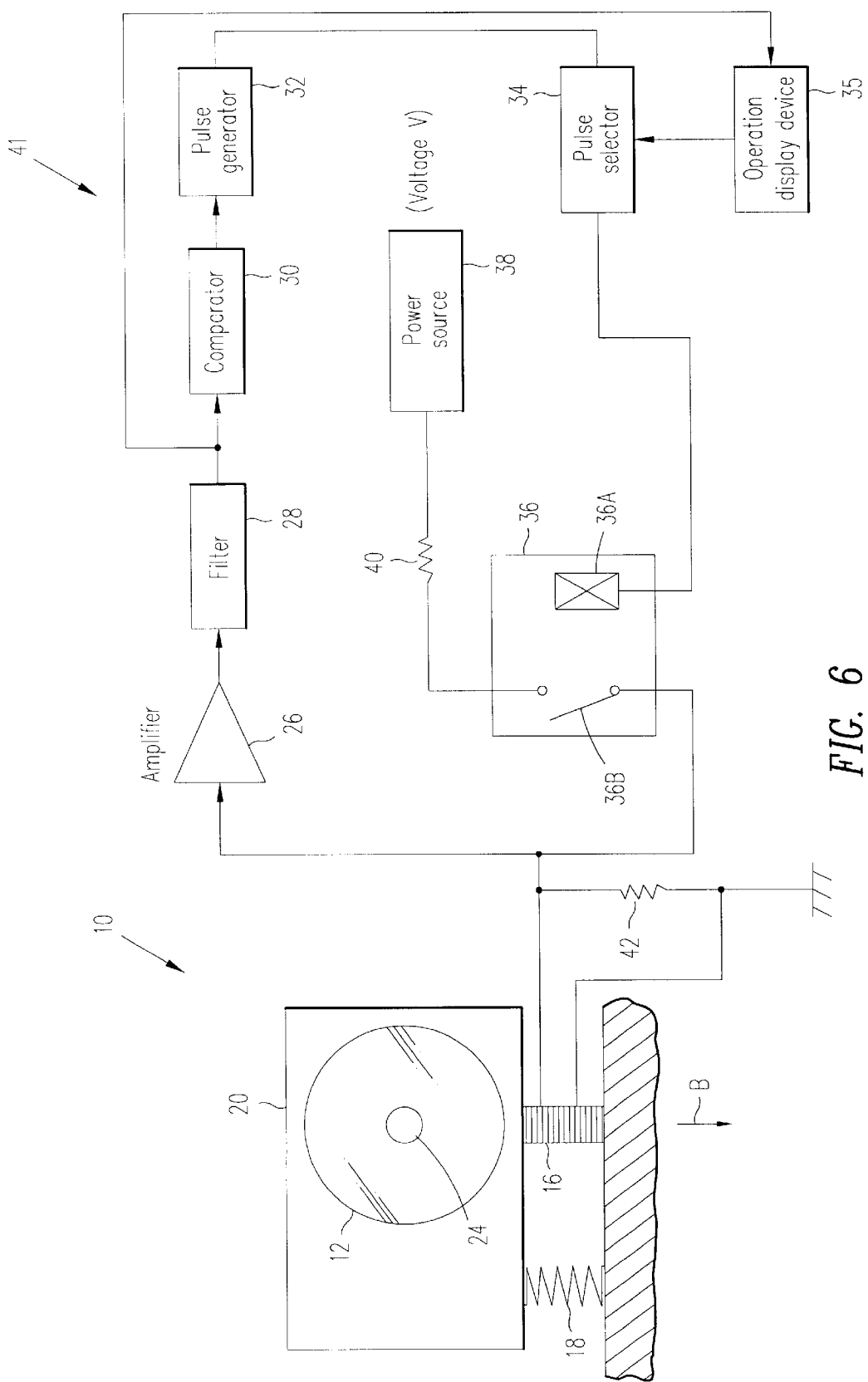
FIG. 6 is a block diagram of a control system of the disk rotation balance adjuster of the first embodiment of the present invention of FIG. 4.

FIG. 6 is a block diagram of a control system 41 of the disk rotation balance adjuster 10 of the first embodiment of the present invention. In the present embodiment, the control system 41 constitutes a control means. The control system 41 comprises an amplifier 26, filter 28, comparator 30, pulse generator 32, pulse selector 34, operation display device 35, relay 36, and power source 38. The amplifier 26 amplifies the output voltage from the piezoelectric element 16. The filter 28 is a circuit which removes noise from the output signal of the amplifier 26 and takes out only a component synchronized with the rotational speed of the disk. The comparator 30 compares the reference value, 0 V, with the output voltage of the filter 28. The pulse generator is a circuit 32 which generates a narrow width pulse after time Δt when the output of the comparator 30 is turned ON. The pulse selector 34 is a circuit 34 which selects one of a plurality of pulses output from the pulse generator 32 according to a selecting signal from an operation display device 35 or display means. The pulse selector 34 is connected to a normally open relay 36 having a relay coil 36A and a relay switch 36B. A power source 38 is connected to one end of the relay switch 36B through a series resistance 40. The other end of the relay switch 36B is connected to the piezoelectric element 16. The relay is activated only when the pulse selector inputs a pulse to a relay coil 36A, i.e. a pulse is selected at the rate of once per prescribed times and output.

One end of the piezoelectric element 16 is grounded and the other end is commonly connected to the amplifier 26 and the relay switch 36B. A node of the piezoelectric element 16, the amplifier 26 and the relay switch 36B is connected to ground through a resistor 42. Therefore, the voltage across the resistor 42 is input to the amplifier 26.

The operation display device 35 comprises an oscilloscope (not shown) for displaying a waveform based on an output signal from the filter 28 and a console panel (not shown). The console panel provides an operator with various instruction keys. Using the operation display device 35, the operator monitors the maximum value of the output waveform 'U' (the magnitude of the imbalance) by displaying the output of the filter 28 on the screen of the oscilloscope. On the display device 35, actuating a stop key stops the pulse selector 34 when the amount of imbalance is below a prescribed threshold value. It is also desirable to stop the rotation of the spindle motor as well as the operation of the pulse selector 34.

Operation of the Disk Rotation Balance Adjuster

FIGS. 7a–7g are timing diagrams of the disk rotation balance adjuster of the first embodiment of the present invention. In a disk drive 20, the spindle 24 was inserted in and adjustably fixed to the central hole of a disk 12. The disk drive 20 is set on the support member 14. When an operator presses a start button, the spindle motor begins to rotate. If the disk 12 is imbalanced, when the disk 12 rotates, a force is generated and has a constantly changing direction. Referring back to FIG. 4, reference character F is the component of the force, parallel to arrow B, exerted on the piezoelectric element 16. Therefore, the piezoelectric element expands and contracts in a direction parallel to arrow B so that a voltage proportional to the force F is generated across the resistor 42.

Figure 7A:
FIGS. 7a, 7b, 7c, 7d, 7e, 7f and 7g are timing diagrams of the disk rotation balance adjuster of the first embodiment of the present invention of FIG. 4.
Figure 7B:
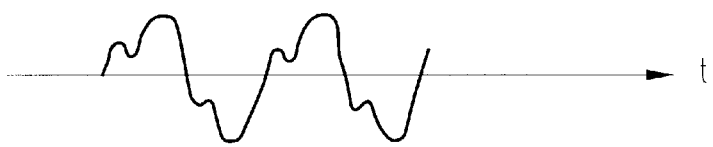
Figure 7C:

In FIG. 7a, the waveform shows the changing voltage value across the resistor 42. The piezoelectric element 16 serves as a measuring means for measuring the radial force on the disk 12 (arrow B). In FIG. 7b, the waveform shows the output voltage of the piezoelectric element 16 after being amplified by the amplifier 26. In FIG. 7c, the waveform 3 shows the output of the filter 28, i.e. the periodic component synchronous with disk 12 rotation. The output of the filter 28 is compared with reference voltage V in the comparator 30. In the present embodiment, the reference voltage is 0 V. The output of the filter 28 is input to and displayed on the operation display device 35, e.g. a screen of an oscilloscope. In FIG. 7c, the maximum value of the force F, namely the amount of imbalance, is U.

Figure 7D:
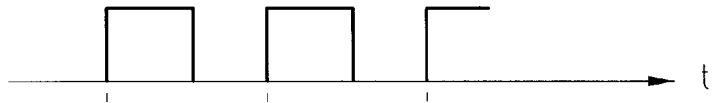
Figure 7E:
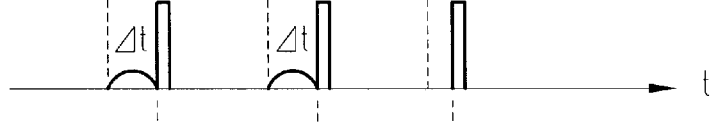

The comparator 30 compares the output signal of the filter 28 with the reference voltage and outputs the pulse signal of FIG. 7d. Upon receiving the pulse signal, as shown by FIG. 7e, the pulse generator 32 outputs a narrow width pulse after time Δt from the leading edge of every input pulse. The time Δt is predetermined by the rotation frequency of the spindle motor (not shown) so that the narrow width pulse rises in substantially the middle of the pulse output by the comparator 30.

Figure 7F:
Figure 7G:

The narrow width pulses generated by the pulse generator 32 are input to the pulse selector 34. When the operator operates a key on the panel of the operation display device 35, a prescribed selecting signal is input to the pulse selector 34. The narrow width pulse is periodically generated. The pulse selector 34 selects a narrow width pulse, depending on the selecting signal, at the rate of once per a prescribed number of times. For example, when a central pulse as shown by the waveform FIG. 7e is selected, a pulse as shown by a waveform of FIG. 7f is applied to the relay coil 36A of the relay 36. The relay switch 36B is activated only during the time from the leading edge to the trailing edge of the pulse, so that a voltage signal, as shown in waveform of FIG. 7g, is applied to the piezoelectric element 16 from the power source 38 through the series resistor 42.

Figure 1:
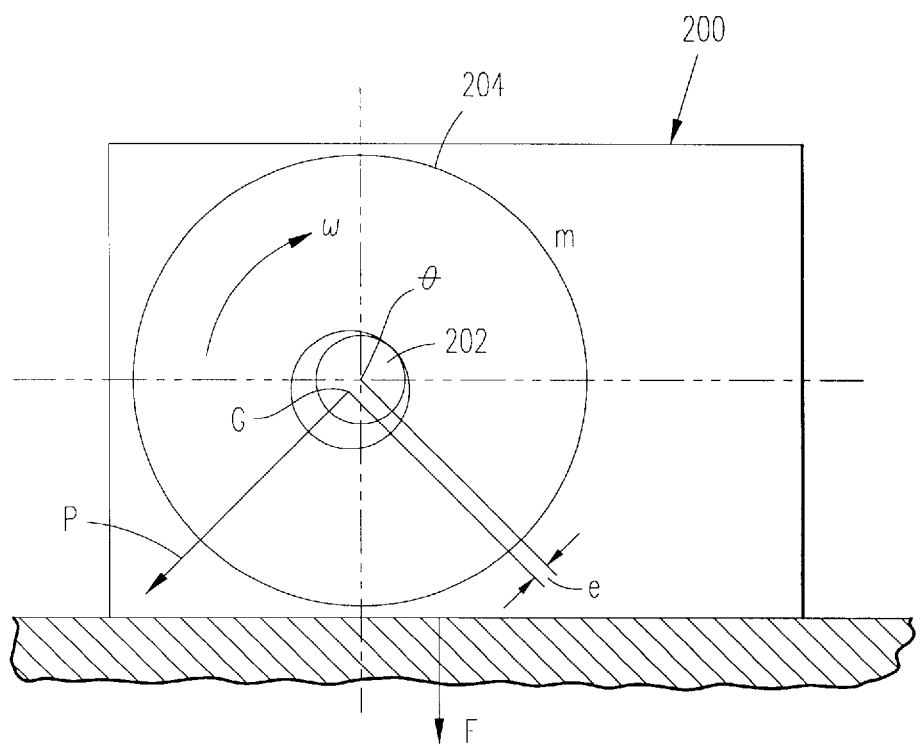
FIG. 1 is a diagram of the force resulting from disk offset.
Figure 2A:
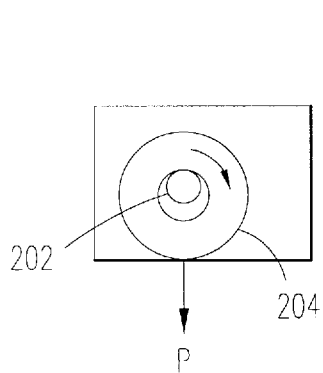
FIGS. 2a, 2b and 2c show the relationship between the periodic motion of the disk and the direction of the force resulting from the disk offset.
Figure 2B:
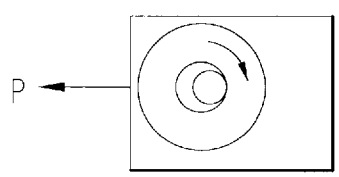
Figure 2C:
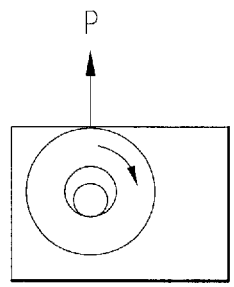

Therefore, the piezoelectric element 16 quickly expands by a prescribed amount corresponding to the voltage signal in the direction opposite arrow B of FIGS. 1 and 2. As a result, a force, namely acceleration, is applied to or exerted on the disk drive 20 in the direction opposite arrow B. The magnitude of the acceleration is proportional to the voltage applied to the piezoelectric element 16. In the present embodiment, the piezoelectric element 16 serves as a means for detecting vibration (means for measuring a force) and also as a means for exerting acceleration (means for applying a force).

When the piezoelectric element accelerates the disk drive 20, the rotating disk 12 tends to maintain its position because of its inertial force, so that only the spindle moves. Consequently, the position of the disk 12 with respect to the spindle 24 changes in the direction which reduces the amount of offset.

In the present embodiment, the voltage of the power source 38 and the value of the series resistor 40 are predetermined to limit the amount of acceleration exerted on the spindle 24 by the piezoelectric element 16. In other words, the magnitude of the acceleration is preset.

The operation described above is repeated and the rotation balance of the disk 12 is gradually adjusted. The operator can recognize when the rotation balance is adjusted by monitoring that the maximum value of the force F displayed on the oscilloscope. In other words, the amount of imbalance U decreases. While observing the amount of imbalance, the operator presses a stop key on the panel of the operation display device the instant that the amount of unbalance U reaches a value below a prescribed value, and the pulse selecting operation of the pulse selector 34 is stopped. Then, at the same time, the stop button of the spindle motor (not shown) is pushed to stop the disk 12 rotation.

After adjusting the rotation balance, the disk 12 is permanently secured to the spindle 24 by a proper method. Therefore, the steps of adjusting the rotation balance of the disk and fixing the disk are completed. In this way, the probability of errors during reading or writing from disk rotation imbalance is effectively decreased.

For example, after adjusting the rotation balance, the following methods can be used during manufacturing to fix the disk to the spindle. In one method, an adhesive agent is applied to the periphery of the spindle 24. The adhesive agent cures after a prescribed time. Alternatively, the adhesive agent is cured by irradiation with ultraviolet light. Next, a top clamp, serving as a fixing means (not shown), is lightly fastened to the spindle 24 so that the disk 12 is not permanently fixed. The rotation balance is adjusted. When the rotation balance adjustment is complete, the adhesive agent is cured. Finally, the disk 12 is fixed to the spindle 24.

According to another method, the disk 12 first is mounted to the spindle 24 and the top clamp is slightly fastened. The rotation balance is adjusted. After adjusting the rotation balance, the top clamp is completely fastened so that the disk 12 is secured to the spindle 24.

Therefore, according to the first embodiment of the present invention, the rotation balance of the disk 12 can be effectively adjusted with high accuracy. Furthermore, since the present invention uses a piezoelectric element 16 to measure the force from the offset and generate a counteracting force, the balance of the disk can be precisely understood. In addition, the rotation balance can be readily adjusted without requiring a track to be formed on the disk prior to adjustment.

In the first embodiment of the present invention, the piezoelectric element performs the function of measuring vibration and exerting acceleration. Alternatively, separate means can be provided for measuring vibration and exerting acceleration.

Although the present invention is described using an exemplary embodiment in which the radial direction of the measured force is the same as the radial direction of the applied acceleration, the radial direction of the measured force and applied acceleration may differ. For example, when a vibration measuring means and an acceleration exerting means are separately provided, even if the measuring direction is different from the direction of the applied acceleration, the rotation balance can be adjusted by determining the appropriate time to apply the acceleration.

Furthermore, the first embodiment describes an exemplary embodiment in which an operator adjusts the rotation balance below a prescribed threshold by viewing the maximum value of a waveform displayed on an oscilloscope. In an alternative embodiment, the amount of imbalance U may be displayed digitally based on the maximum value of the force F when selected by the pulse selector 34. Therefore, the operator can easily determine whether the displayed digital value is below a prescribed threshold, and operability is improved.

A second embodiment of the present invention will be described with reference to FIGS. 8 and 9. Similar reference numerals represent similar components in the first and second embodiments.

Figure 8:
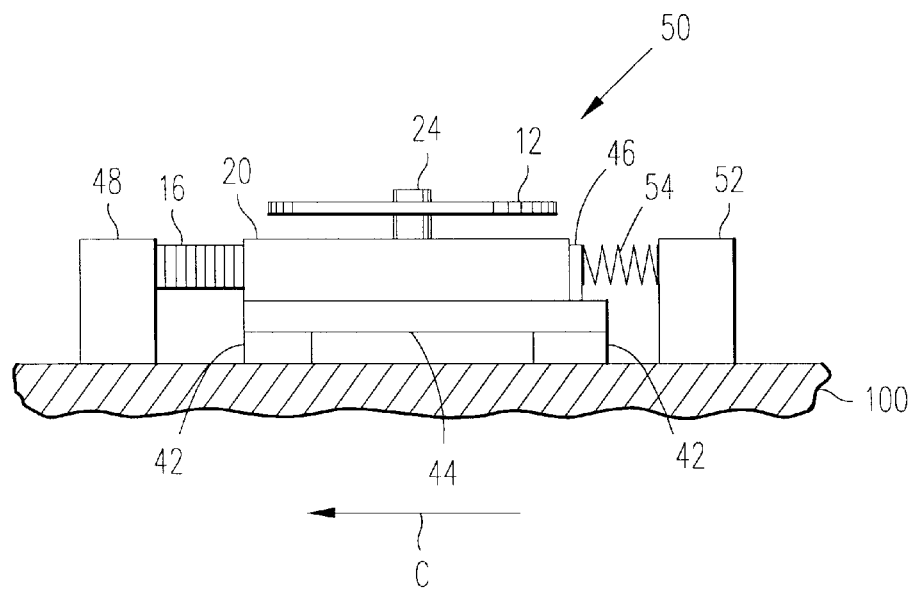
FIG. 8 is a side view of a disk rotation balance adjuster in a second embodiment of the present invention.
Figure 9:
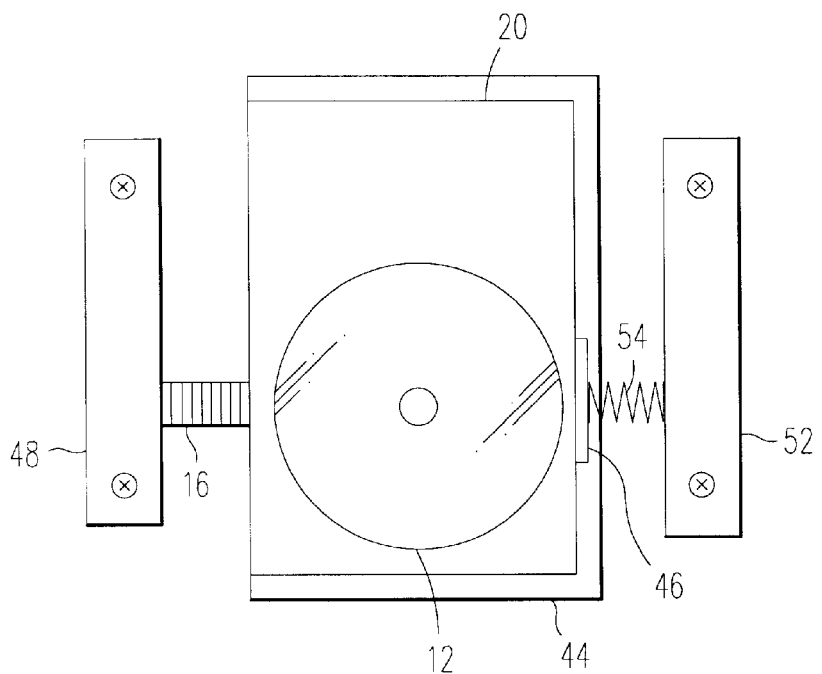
FIG. 9 is a top view of the disk rotation balance adjuster of the second embodiment of the present invention of FIG. 8.

FIG. 8 is a side view of a disk rotation balance adjuster of the second embodiment of the present invention. FIG. 9 shows a top view of the disk rotation balance adjuster of FIG. 8. The disk rotation balance adjuster 50 comprises a pair of linear bearings 42, spaced apart at a prescribed distance on the support member 100. A slider 44 is formed with a rectangular parallelpiped shape. The slider 44 is provided on the linear bearings 42 and reciprocates back and forth parallel to arrow C. A stopper member 46 is provided at one end of the slider 44. A pair of rectangular parallelpiped shaped blocks 48 and 52 are provided laterally at both ends of the slider 44. The blocks 48 and 52 are spaced apart at a prescribed distance and the slider 44 is positioned therebetween. The blocks 48 and 52 are fixed to the support member 100 with screws.

A disk drive 20 is positioned on the slider 44 with one end abutting the stopper member 46. A piezoelectric element 16 is provided between one of the blocks 48 and the disk drive 20. One end of the piezoelectric element 16 is fixed to the block 48.

A compression coil spring 54 is provided between the other block 52 and the stopper member 46. The compression coil spring 54 urges the slider 44 toward the piezoelectric element 16 through the stopper member 46. The control system or the like has the same construction as in the first embodiment.

The operation and effects of the second embodiment are similar to the first embodiment.

Figure 10:
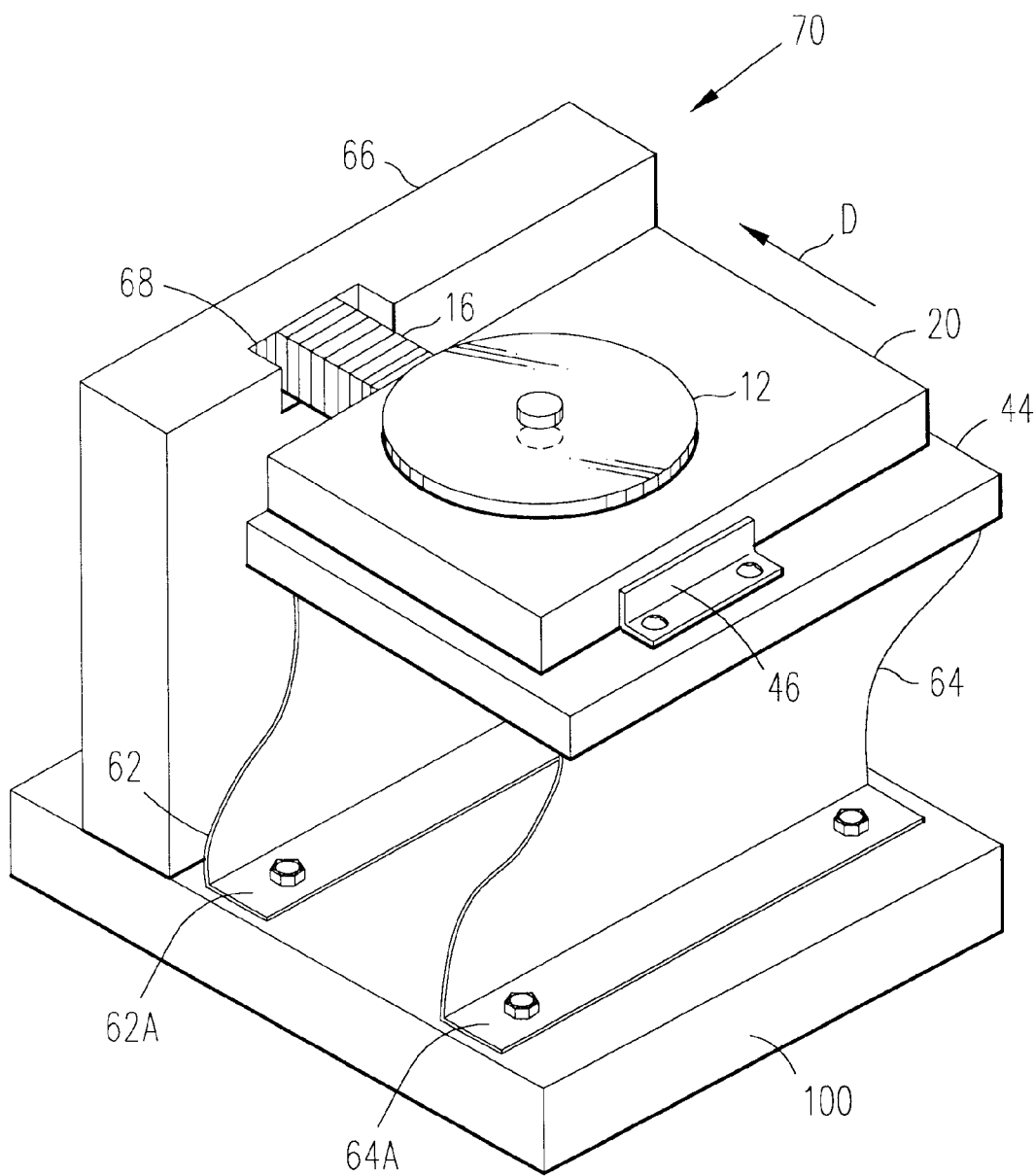
FIG. 10 is a perspective view of a disk rotation balance adjuster in a third embodiment of the present invention.

A third embodiment of the present invention will be described. FIG. 10 shows a perspective view of a disk rotation balance adjuster of the third embodiment of the present invention. In the following description, similar components among the first, second, and third embodiments will be represented by similar symbols.

In FIG. 10, a rotation balance adjuster 70 of a disk is provided with a pair of leaf springs 62 and 64 formed substantially in a Z shape. The leaf springs 62 and 64 are fixed by screws to the support member 100. The lower attaching parts 62A and 64A of the leaf springs are spaced apart at a prescribed distance and in parallel to each other on the support member 100. A slider 44 is arranged on the upper surfaces of the leaf springs 62 and 64 and is held in parallel to the plane of the support member 100. A stopper member 46 has an L-shape and is fixed with screws to an area near one end of the slider 44, i.e. near the sloped lower end of the slider 44. The slider 44 can reciprocate back and forth parallel to arrow D. The resiliency of the leaf springs 62 and 64 continuously urge the slider 44 in the direction of arrow D.

In the front part of the slider 44 in the direction of arrow D, a block 66 is spaced from the slider 44 at a prescribed distance. The block 66 is parallel to the end surfaces of the lower attaching part 62A of the leaf spring 62 and the slider 44. The block 66 is fixed to the support member 100.

A disk drive 20, with one end abutting the stopper member 46, is mounted on the upper surface of the slider 44.

A piezoelectric element 16 is provided between the block 66 and the disk drive 20. The block 66 has a recessed groove 68 in its inner wall surface. The end face of the piezoelectric element 16 located in the block 66 side is fixed to the inner wall surface of the recessed groove 68. The control system or the like has the same construction as in the first embodiment.

The operation and effects of the third embodiment are similar to the first and second embodiments.

Figure 11:
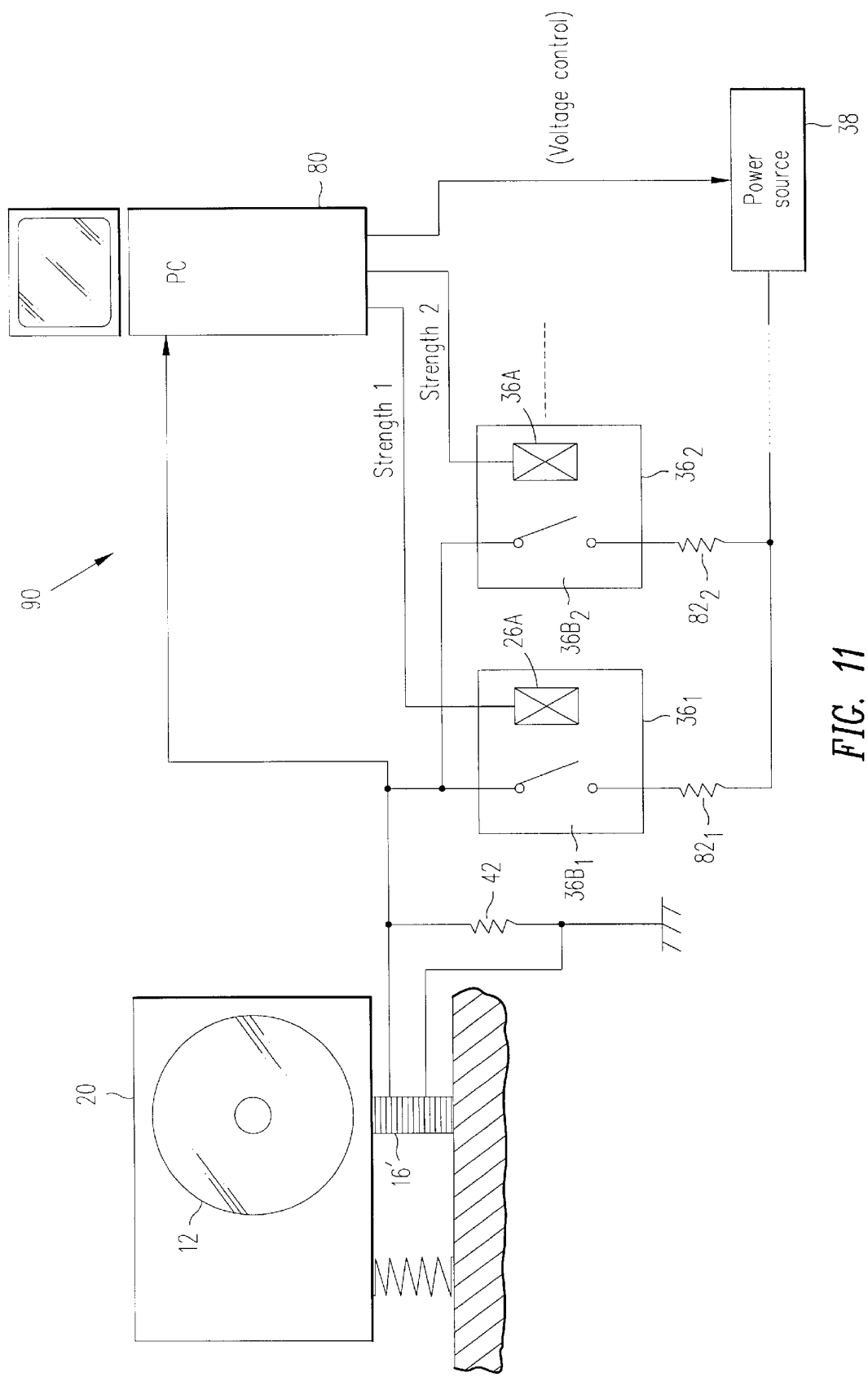
FIG. 11 is a block diagram of a control system of a disk rotation balance adjuster in a fourth embodiment of the present invention.

A fourth embodiment of the present invention will be now described. FIG. 11 shows a block diagram of a control system of a disk rotation balance adjuster of the fourth embodiment of the present invention. In the following description, similar or equivalent components between the first and fourth embodiment are represented with the same symbols.

A control system 90 comprising a computer 80 as a main member is substituted for the control system of the first embodiment.

In control system 90, a plurality of resistors $82_1, 82_2, \ldots$, with different resistance values, are commonly connected to a power source 38 and the other side of each resistor is connected to one end of a plurality of relay switches $36B_1$, $36B_2, \ldots$. The other ends of the relay switches $36B_1$, $36B_2, \ldots$ are commonly connected to a piezoelectric element 16.

The computer 80 controls the application of the acceleration by activating the respective relay coils 36A to switch the contacts of the respective relay switches 36B. The computer 80 can also control the voltage of the power source 38. In addition, the voltage applied across the resistor 42 is input to the computer 80.

The construction of the other mechanisms or the like are identical to those of the first embodiment. In the fourth embodiment, functions similar to the filter, comparator, pulse generator and the pulse selector in the control system of the first embodiment are implemented using a control program in the CPU of the computer 80. Furthermore, the computer 80 also has functions for adjusting source voltage and series resistance. The series resistance is adjusted by selectively activating a plurality of relays $36_1, 36_2, \ldots$ In an alternative embodiment, a single variable resistor is provided in place of resistors $82_1, 82_2, \ldots$ and the computer 80 controls the variable resistor.

Therefore, the fourth embodiment of the present invention performs the same function and produces the same results as in the first embodiment. Moreover, when adjusting the rotation balance of the disk in a manner similar to that of the first embodiment, the computer 80 can detect when the maximum value of the force F, the amount of imbalance U, reaches a value below a prescribed threshold, and then automatically stops the device. Such operation can be easily implemented by changing the software.

Although the disk drive of the first through fourth embodiments uses an exemplary magnetic disk 12, the scope of the present invention is not meant to be limited to magnetic disks. The present invention can be used with optical, magneto-optical or similar disks. Even when using an optical disk, no track needs to be formed on the disk surface. In addition, the method and apparatus of the present invention may be used to adjust the rotation balance of other types of disks which are adjustably fixed to a spindle. Therefore, the present invention can be applied to a wide range of disk drives.

Furthermore, in the first to fourth embodiments, a single piezoelectric element 16 comprises the measuring means and the acceleration exerting means. However, the present invention is not meant to be limited to a single combined measuring means and acceleration exerting means, and the measuring means and the acceleration exerting means may be separate devices. In an alternative embodiment, the measuring means may be formed with a suitable force sensor and the acceleration exerting means may be formed with an electromagnetic actuator capable of exerting an acceleration proportional to a current value to the spindle 24. For example, the acceleration exerting means can comprise an electromagnet, a solenoid or a voice coil motor.

In addition, the direction of the force measured by the measuring means does not always need to coincide with the direction of acceleration exerted on the spindle 24 by the acceleration exerting means. Alternatively, the direction of the measured force can differ from the direction of acceleration.

In another alternative embodiment, although the measuring means and the acceleration exerting means can be formed using a piezoelectric element as a single force measuring/acceleration generating element, other force measuring/acceleration generating elements may also be used. For example, an electrostrictive or magnetostrictive element may be used instead of the piezoelectric element 16. When an electrostrictive element is used as the measuring means, the electrostrictive element constantly generates a voltage proportional to the square root of the amount of imbalance. When the electrostrictive element is used as an acceleration exerting means, the electrostrictive element exerts acceleration proportional to the square of the applied voltage on the spindle. In contrast, when a magnetostrictive element is used as a measuring means, the magnetostrictive element constantly generates a magnetic field proportional to the amount of imbalance. When used as an acceleration exerting means, the magnetostrictive element exerts acceleration proportional to the applied magnetic field strength on the spindle.

In the first to fourth embodiments, the adjustment of static balance in a disk drive having a small number of disks fixed to the spindle has been described. A fifth embodiment of the present invention considers the adjustment of dynamic balance, which becomes an important problem as the number of disks increases. In the fifth embodiment, both the static and dynamic balance can be adjusted.

Figure 12:
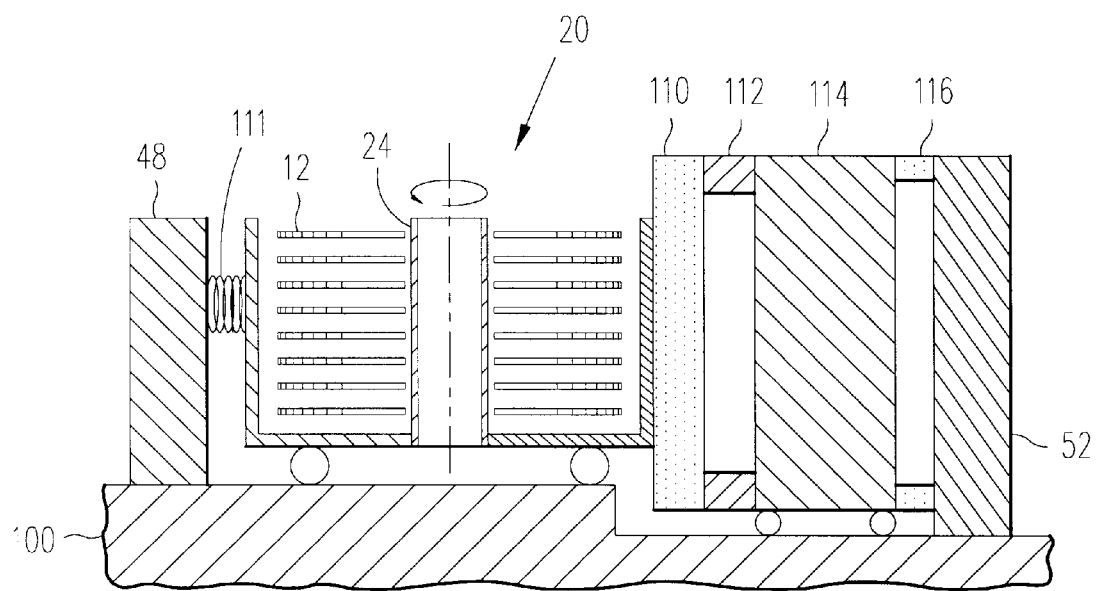
FIG. 12 is a side view of a disk rotation balance adjuster for a disk drive having a plurality of disks in a fifth embodiment of the present invention.

FIG. 12 is a side view of a disk rotation balance adjuster of a fifth embodiment of the present invention. The fifth embodiment improves the first to fourth embodiments and increases the number of actuators and force sensors to two. Since other components are the same as those described above, the same symbols will be used and will not be described.

A pair of blocks 48 and 52 are fixed onto a fixed member 100. A compression coil spring 111 is attached to the block 48 to urge the hard disk drive 20 to the right. The hard disk drive 20 has a plurality of disks 12. The disks 12 in the hard disk drive 20 rotate during the balance adjustment. Translational (rectilinear) and torque vibration are generated because the disks are unbalanced. During adjustment, the disks 12 are adjustably fixed to the spindle 24 of the hard disk drive 20 so that the acceleration resulting from an external impact can cause the disks to slip with respect to the spindle.

At least two piezoelectric elements 112 are attached to the right side of the disks through a plate 110. The two piezoelectric elements 112 are spaced apart at a prescribed distance parallel to the spindle 24, so that the acceleration in the rotating direction can be exerted on the disks 12. This point is similar to the embodiments described above. The elements may be axially opposed to each other relative to the center of gravity of the spindle. Furthermore, a weight (mass) 114 is provided to the right and at least two force sensors 116 are sandwiched between the weight 114 and a block 52 at the right. The plurality of sensors 116 measure the translational force due to static balance and the torque vibration force due to dynamic balance.

Figure 3A:
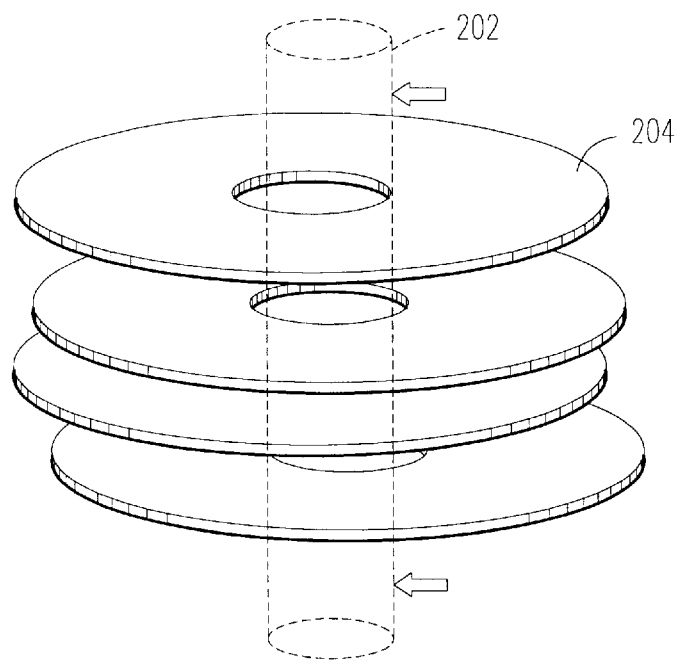
FIG. 3a shows a plurality of disks fixed to a spindle.
Figure 3B:
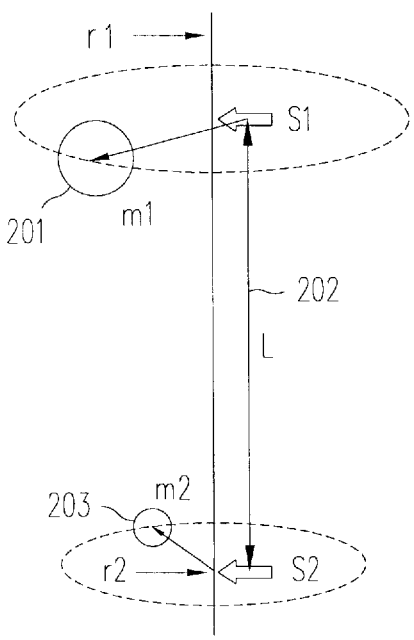

In the present embodiment, a plurality of disks adjustably fixed to the spindle in the disk drive 20 can be equivalently represented using the model previously discussed in FIG. 3b. According to the present embodiment, both values of the amount of imbalance $m_1 \cdot r_1$, $m_2 \cdot r_2$ ($r_1$ and $r_2$ represent vectors) can be decreased to below a prescribed value. Both the translational and torque vibration components are decreased. Therefore, both the dynamic and the static balance can be adjusted simultaneously.

To adjust the dynamic balance, the amount of slip of the top disk is selectively increased more than the slip of the bottom disk. Conversely, the amount of slip of the bottom disk can be selectively increased more than the slip of the top disk.

Figure 13A:
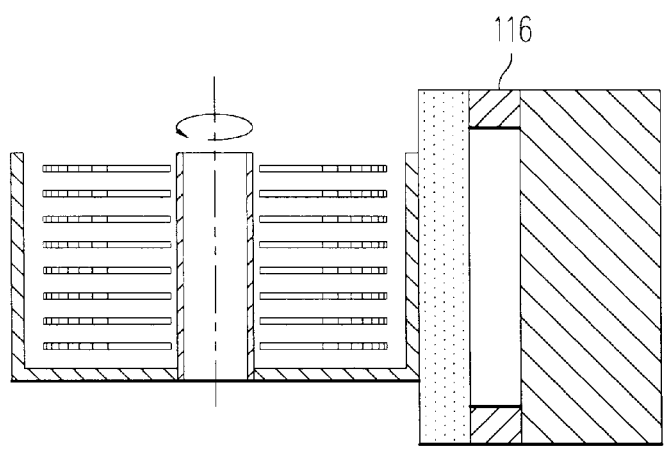
FIG. 13a shows the actuator portion of the fifth embodiment of the present invention of FIG. 12.

Referring to FIGS. 13a, 13b, 13c, and 13d, a conceptual view of a method for selectively controlling the amount of slip of the disk is shown. FIG. 13a is a view showing only the actuator portion of FIG. 12. FIG. 13b shows the dynamic model of the system of FIG. 13a.

The center of gravity of the disk is G. The spindle is line x. The origin O is the intersection of the center of gravity G and the spindle x. In addition, the distance from the center of gravity G to the upper end of the spindle is h. A force F is exerted on a part spaced apart at a distance 1 from a dashed line extending from the center of gravity G, normal to the spindle, through the flat plate attached at the right. At this time, acceleration a(x) distributed on the spindle is observed. This a(x) can be obtained in the following manner as described below. Initially, the translational acceleration $a_G$ of the entire disk drive due to force F is:

$$a_G = F/M, \text{ where } M = \text{mass of the disk drive.} \quad (2)$$

Furthermore, the angular acceleration α about the center of gravity G is expressed by the following formula:

$$\alpha = (1F)/I, \text{ where } I = \text{angular moment with respect to the center of gravity } G \text{ of the disk drive.} \quad (3)$$

FIG. 13c shows the distribution of the acceleration. When an upper actuator is operated, a larger acceleration is exerted on the top disk. Therefore, the amount of slip of the top disk can be controlled so that it becomes larger than the amount of slip of the bottom disk. Furthermore, in FIG. 13d, the acceleration exerted on the bottom disk can be made to reach 0. Therefore, 1 may be calculated to satisfy the following equation:

$$(1/m - 1_x/I) = 0 \quad (4)$$

While the theory for the method for selectively controlling the amount of slip has been described above, in practice the adjusting operation is carried out in the following manner. First, the disks are rotated and the vibration is measured by the two sensors. Then, the sensor having the larger amplitude of vibration is selected and only the actuator attached to that sensor is actuated. For example, if the output of the top sensor is larger, the top actuator is actuated. If the actuator is actuated at a suitable time, only the upper disk slips and causes the amplitude of vibration of the top sensor to decrease. The operation is repeated until the output of both sensors is reduced to below a specified threshold or value, and the disk rotation balance is adjusted.

In the present embodiment, various kinds of modifications can be made to the first to fourth embodiments which are also applicable to the present embodiment.

As described above, according to the present embodiment, the torque vibration caused by the dynamic imbalance is a problem when a plurality of disks are fixed along a spindle. The dynamic imbalance can be effectively decreased similar to the static balance adjustment. Since the rotation balance can be adjusted without stopping the rotation of the disks, the adjustment can be efficiently performed when adjusting the static balance.

The first and fifth embodiments are directed to the rotation balance adjustment in which the disks are adjustably fixed to the spindle; and after exerting an acceleration, such as an impact, on the disks, the disks are permanently fixed to the spindle. In an alternative embodiment, the method of the present invention can be used even if the disks are permanently fixed to the spindle. A weight assembly, made of a plastically deformable material, is attached to the disks and acceleration is exerted on the disks.

Figure 14:
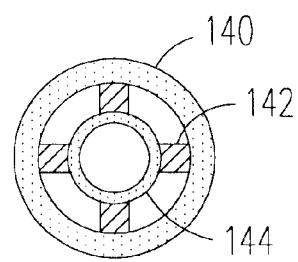
FIG. 14 shows the structure of a weight assembly in a sixth embodiment of the present invention.

Referring to FIG. 14, a view of the structure of a weight assembly of an alternative embodiment is shown. The inside diameter of an inner ring 144 serving as a fixing member is larger than the outside diameter of the spindle of a disk drive. Support members 142 are made of a plastically deformable material. One end of each support member 142 is fixed to the outside diameter of the inner ring 144 and the other end of each support member 142 is fixed to the inside diameter area of a weight 140. Because the weight 140 is mounted on the spindle, preferably the weight 140 is circular. However, the weight 140 is not necessarily limited to a circular shape.

Figure 15:
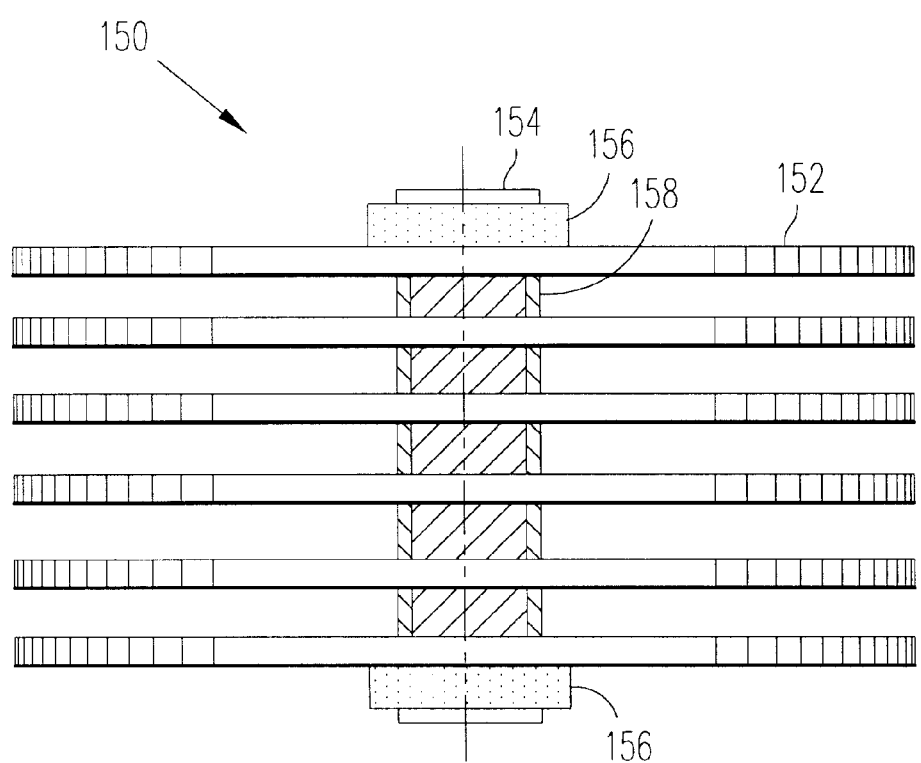
FIG. 15 shows a disk assembly in which the weight assembly is mounted to a spindle having fixed disks.

FIG. 15 shows a disk assembly of a disk drive with the weight assembly mounted on the spindle. A plurality of disks 152 are fixed axially to the spindle 154 through spacers 158 in the disk assembly 150. The weight assembly 156 is mounted at both the upper and lower ends of the spindle 154.

Figure 16:
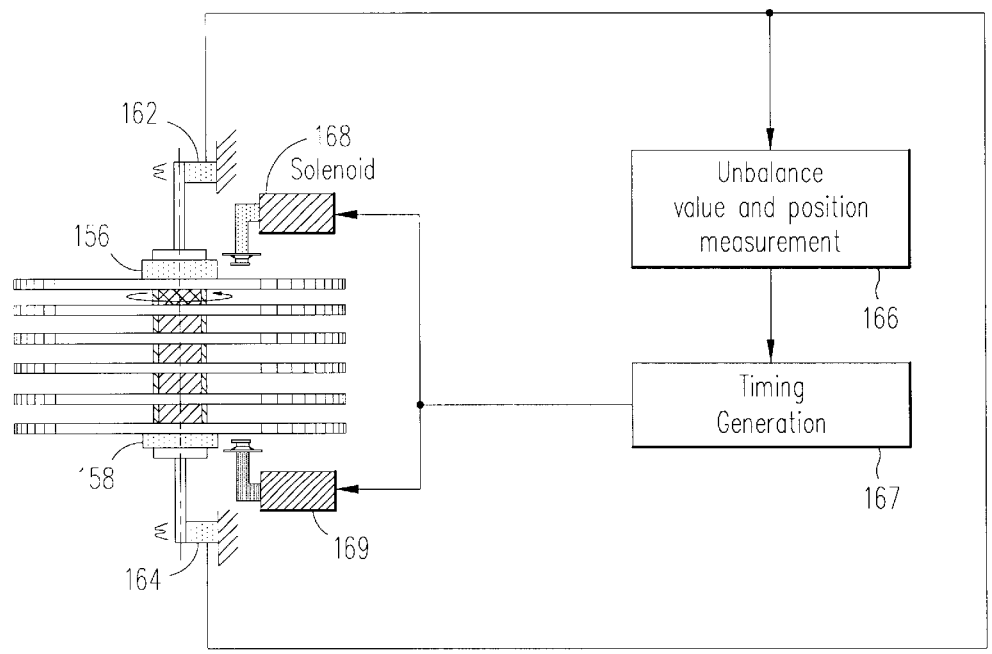
FIG. 16 is a diagram of a rotation balance adjuster using the weight assembly.

FIG. 16 is a diagram of a balance adjuster using the weight assembly. Force sensors 162, 164 measure the amount of balance of the disk assembly 150 and are provided on the upper and lower ends of the spindle. A signal related to the vibration force measured by the force sensors 162 and 164 is input to a measuring means 166 so that the amount of imbalance and rotational position of the disks is calculated. Then, the calculated amount of imbalance and position is input to a timing generating means 167, to determine when and which solenoid 168 or 169 is operated with respect to the rotation frequency of the disks. Then, when a solenoid is operated, the weight assembly is moved instantaneously. Since the support members of the weight assembly are made of a plastically deformable material, the instantaneous movement deforms the weight assembly. As a result, the amount of imbalance of the disks decreases. The operation is repeated until the amount of imbalance falls below a specified value.

Figure 17A:
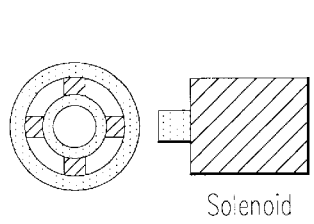
FIGS. 17a, 17b and 17c show the states in which the weight assembly is moved by a solenoid.
Figure 17B:
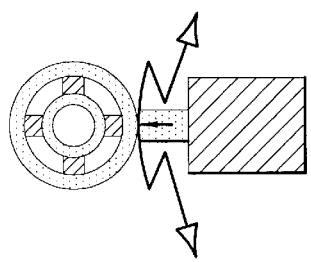
Figure 17C:
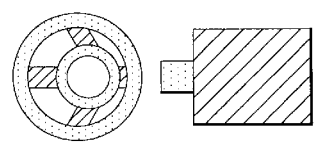

FIGS. 17a, 17b, and 17c show the states of the weight assembly as it is moved by the solenoid. It can be understood that the magnetic action of the solenoid deforms the plastically deformable material to reduce the amount of imbalance of the disk. For example, the amount of unbalance of a disk pack is generally about 0.2 g·cm. Assuming that the weight assembly weighs 5 g, the amount of displacement can be as large as 0.4 mm.

Furthermore, it is important that the support member be designed so that the force of the solenoid plastically deforms the support member, yet the support member have sufficient strength so that other externally applied forces do not deform the support member. In addition, an adhesive agent, which cures over time or with ultraviolet light, may also be previously applied to the support members to effectively fix the disks.

Figure 18:
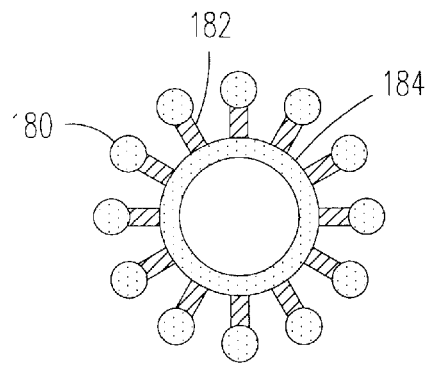
FIG. 18 shows an alternative embodiment of a weight assembly in a seventh embodiment of the present invention.

FIG. 18 shows an alternative structure of a weight assembly in a seventh embodiment of the present invention. The weight assembly comprises a circular inner ring 184 having the inside diameter larger than the outside diameter of the spindle and a plurality of support members 182. One end of each of support member 182 is fixed to the outside diameter of the inner ring 184 and the other end of each support member is fixed to a weight 180. The support member 182 is made of a deformable material or 10 a material capable of being cut by heat. In the present embodiment, the balance adjuster of FIG. 16 uses a pulse/laser generator in place of the solenoids 168 and 169.

Figure 19A:
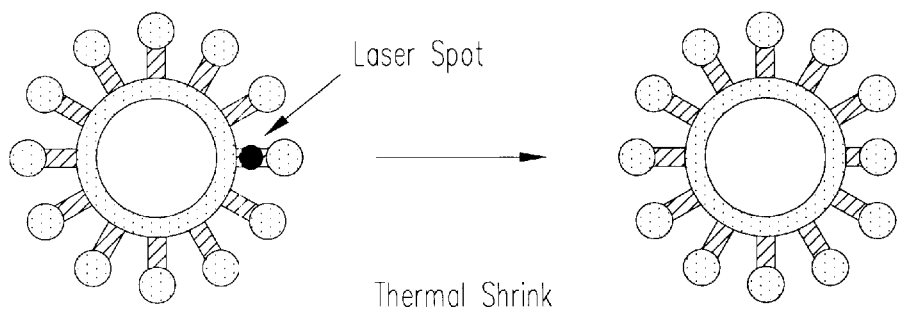
FIG. 19a shows a method for adjusting rotation balance by thermal deformation using the weight assembly of FIG. 18.

FIGS. 19a an 19b show the states of the weight assembly of FIG. 18 during deformation or cutting. FIG. 19a shows a method for adjusting the rotation balance by thermal deformation using heat to shrink the support members. FIG. 19a shows the states before and after adjustment. When the support members are irradiated by a laser, the heat of the laser causes the irradiated portions to shrink causing the weights at the ends of the support members to move towards the center of the inner ring. The amount of shrinking can be controlled by the intensity of the laser and the number of times irradiated. Therefore, the support members may be continuously irradiated by the laser while the disks are rotating and while measuring the amount of imbalance until the amount of imbalance falls below a specified value.

Figure 19B:
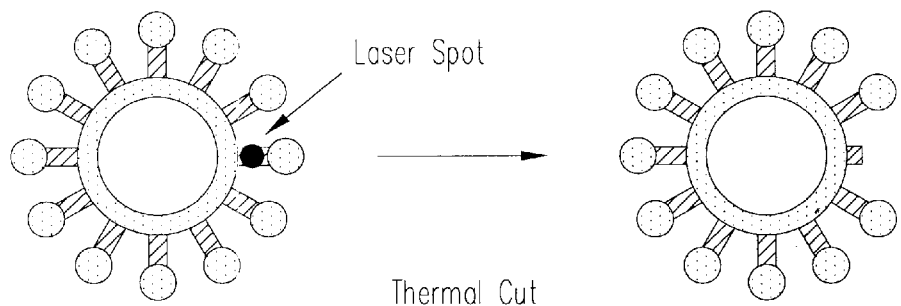
FIG. 19b shows a method for adjusting rotation balance by cutting using the weight assembly of FIG. 18.

FIG. 19b shows a method for adjusting the rotation balance by cutting. The support members are made of a material capable of being cut by heat. The support members are cut with a laser and the weights are removed. The support members may also be cut consecutively while the disks are rotating. The amount of imbalance is measured and the cutting operation continues until the amount of imbalance falls below a specified value.

Therefore, according to the present invention, even if the disks are permanently fixed to the spindle, the balance of the disks can be adjusted by deforming the weight assembly.

In the present embodiment, although the weight assembly is attached at both ends of the spindle to adjust the dynamic balance, alternatively the weight assembly may be used to adjust the static balance of the first to fourth embodiments because only the static balance needs to be considered for a short axis of rotation. When used in the first to fourth embodiments, preferably the weight assembly is provided at one end of the spindle.

Although the present embodiments were described by exerting a constant acceleration on the spindle, in alternative embodiments, the repeated application of acceleration may be controlled to gradually decrease the magnitude of the acceleration. Various methods can be used to exert acceleration.

As stated before, according to the present invention, since the force generated during disk rotation is measured and the rotation balance is adjusted, a highly accurate adjustment can be performed. In addition, since the rotation balance can be adjusted without stopping the disk, the rotation balance is adjusted efficiently. Furthermore, the present invention can be used to adjust the rotation balance of disks without having to form a track the surface of the disk.

What is claimed is:

1. An apparatus comprising:
   a spindle having a longitudinal axis and an outside diameter;
   a disk mounted on the spindle through an interior hole in the disk so that a diameter of the disk is generally perpendicular to the longitudinal axis of the spindle, the hole having an inside diameter larger than the outside diameter of the spindle such that a center of gravity of the disk is not aligned with a center axis of the spindle when the disk is biased against the spindle;
   means for rotating the spindle around the longitudinal axis;
   means for loosely coupling the disk to the spindle so that rotating the spindle results in rotation of the disk while leaving the spindle movable in relation to the rotating disk when the spindle is subjected to a time-varying external force; and
   means for firmly attaching the disk to the spindle to prevent relative movement between the disk and the spindle;
   whereby, a rotational balance of the apparatus may be adjusted during assembly while the disk is loosely coupled to the spindle by subjecting the spindle to a time-varying external force.

2. The apparatus of claim 1 wherein the means for loosely coupling the disk comprises an adhesive agent which loosely binds the disk prior to the adhesive agent being subjected to a curing process; and the means for firmly attaching the disk comprises the adhesive agent after curing.

3. An apparatus comprising:
   a rotatable spindle having a longitudinal axis;
   a disk mounted on the spindle, the disk having a center of gravity at a first position offset from the longitudinal axis; and
   a weight assembly mounted on the spindle, the weight assembly being asymmetrical with respect to the longitudinal axis of the spindle, the weight assembly having a center of gravity at a second position which is offset from the longitudinal axis of the spindle and the first position to improve a rotational balance of the apparatus.

4. The apparatus of claim 3 wherein the weight assembly comprises an inner ring of rigid material, and a plurality of deformable elements attached to the inner ring with at least one of the deformable elements being asymmetrical with respect to other deformable elements.

5. The apparatus of claim 3 wherein the weight assembly comprises an inner ring of rigid material, an outer ring of rigid material, and the outer ring is offset in relation to the inner ring.

6. The apparatus of claim 3 wherein the weight assembly comprises an inner ring of rigid material, an outer ring of rigid material, at least one deformable spoke connecting the inner ring to the outer ring, and the outer ring is offset in relation to the inner ring due to deformation of the deformable spoke.

7. The apparatus of claim 3 wherein the weight assembly comprises an inner ring of rigid material, a plurality of outer components of rigid material, and at least one of the outer components being asymmetrical to the other outer components.

8. The apparatus of claim 3 wherein the weight assembly comprises an inner ring of rigid material and a plurality of outer components of rigid material connected to the inner ring, and the outer components having a combined center of gravity offset from a center of the inner ring.

9. The apparatus of claim 3 wherein the weight assembly comprises an inner ring of rigid material and a plurality of deformable elements allowing the rotational balance of the apparatus to be adjusted by deforming one or more of the deformable elements.

10. The apparatus of claim 9 wherein the deformable elements are deformed as a result of an acceleration being applied while the deformable elements were being heated.

* * * * *